United States Patent
Pleasant et al.

(10) Patent No.: US 6,823,178 B2
(45) Date of Patent: Nov. 23, 2004

(54) HIGH-SPEED POINT-TO-POINT MODEM-LESS MICROWAVE RADIO FREQUENCY LINK USING DIRECT FREQUENCY MODULATION

(75) Inventors: Wayne E. Pleasant, Turners Falls, MA (US); Joseph Chandler, Northampton, MA (US)

(73) Assignee: YDI Wireless, Inc., South Deerfield, MA (US)

( * ) Notice: Subject to any disclaimer, the term of this patent is extended or adjusted under 35 U.S.C. 154(b) by 613 days.

(21) Appl. No.: 09/783,722

(22) Filed: Feb. 14, 2001

(65) Prior Publication Data

US 2002/0111150 A1 Aug. 15, 2002

(51) Int. Cl.$^7$ ............................................... H04B 7/155
(52) U.S. Cl. ........................................ 455/119; 455/21
(58) Field of Search ................................ 455/119, 313, 455/76, 11.1, 20, 21, 22, 23, 17

(56) References Cited

U.S. PATENT DOCUMENTS

| | | | |
|---|---|---|---|
| 4,387,351 A | * 6/1983 | Furiga et al. | 332/127 |
| 4,707,670 A | * 11/1987 | Dakin | 332/127 |
| 4,814,773 A | 3/1989 | Wechsberg et al. | 342/368 |
| 4,876,742 A | 10/1989 | Vacon et al. | 455/66 |
| 4,994,768 A | * 2/1991 | Shepherd et al. | 332/127 |
| 5,025,487 A | 6/1991 | Eichen | 455/618 |
| 5,331,453 A | 7/1994 | Lipsky | 359/191 |
| 5,365,239 A | 11/1994 | Stilwell, Jr. | 342/368 |
| 5,369,410 A | 11/1994 | Reich | 342/175 |
| 5,617,239 A | 4/1997 | Walker | 359/181 |
| 5,682,256 A | 10/1997 | Motley et al. | 359/117 |
| 5,706,310 A | 1/1998 | Wang et al. | 375/296 |
| 5,710,651 A | 1/1998 | Logan, Jr. | 359/145 |
| 5,774,788 A | * 6/1998 | Hannah et al. | 455/12.1 |
| 5,784,413 A | 7/1998 | Chen | 375/308 |
| 5,809,395 A | 9/1998 | Hamilton-Piercy et al. | 455/4.1 |
| 5,896,211 A | * 4/1999 | Watanabe | 398/76 |
| 5,903,609 A | 5/1999 | Kool et al. | 375/261 |
| 5,966,055 A | 10/1999 | Knoedl, Jr. et al. | 332/103 |
| 5,978,117 A | 11/1999 | Koonen | 359/125 |
| 5,987,303 A | 11/1999 | Dutta et al. | 455/3.1 |
| 5,995,812 A | * 11/1999 | Soleimani et al. | 455/119 |
| 6,091,940 A | 7/2000 | Sorrells et al. | 455/118 |
| 6,115,162 A | 9/2000 | Graves et al. | 359/173 |
| 6,118,566 A | 9/2000 | Price | 359/181 |
| 6,222,658 B1 | 4/2001 | Dishman et al. | 359/172 |
| 6,282,180 B1 | 8/2001 | Paneth et al. | 370/330 |
| 6,345,173 B1 | * 2/2002 | Fourtet et al. | 455/76 |
| 6,353,735 B1 | 3/2002 | Sorrells et al. | 455/118 |
| 6,366,620 B1 | 4/2002 | Jackson et al. | 375/308 |

FOREIGN PATENT DOCUMENTS

| | | |
|---|---|---|
| DE | 19705253 | 8/1998 |
| WO | WO99/62229 | 12/1999 |

OTHER PUBLICATIONS

Liu, Q., et al., "Modeling and Experimental Comparison Of Optoelectronic Mixers With The Use Of A Metal–Semiconductor–Metal Photodetector," *Microwave And Optical Technology Letters*, 14(3) 173–175 (Feb. 20, 1997).

(List continued on next page.)

Primary Examiner—Edward F. Urban
Assistant Examiner—Blane J. Jackson
(74) Attorney, Agent, or Firm—Hamilton, Brook, Smith & Reynolds, P.C.

(57) ABSTRACT

A point-to-point microwave radio link that operates in a Frequency Division Duplex (FDD) mode using direct digital modulation with a Continuous Phase-Frequency Shift Keyed (CP-FSK) scheme. The transmit signal is generated by a circuit that uses a Voltage-Control Oscillator (VCO) operating in a microwave radio band. The VCO is deviated over a narrow frequency range that is reduced by a predetermined factor. The output of the VCO is then frequency multiplied by the predetermined factor to produce the modulated microwave output signal at the desired band. The deviation frequency of the VCO is thus chosen to be the reciprocal of the multiplication factor times the transport bit rate.

11 Claims, 3 Drawing Sheets

OTHER PUBLICATIONS

Stone, R., et al., "Independent Phase and Magnitude Control of an Optically Carried Microwave Signal with a Three-Terminal Vertical-Cavity Surface-Emitting Laser," *IEEE Photonics Technology Letters,* 11(4)463–465 (Apr. 1999).

Nicoletti, P., et al., "STRATUM: Broadband Wireless Transport for Ethernet and T1," 4 pages, Proxim, Inc. (Feb. 2000).

Secco, P., et al., "Multi-Service Broadband Wireless Access Solutions" (Harris Corporation). Paper presented at the SUPERCOMM 2000 Trade Show, Atlanta, Georgia (Jun. 6–8, 2000).

BreezeCOM—Company Info. Network Buyer's Guide [online], May 2001 [retrieved on Feb. 5, 2001]. Retrieved from the Internet http://www.networkbuyersguide.com/search/271000.htm.

Cisco Aironet 340 Series Ethernet Bridges—Building-to-Building Wireless Solutions [online], May 2001 [retrieved on May 2, 2001]. Retrieved from the Internet http://www.cisco.com/warp/public/cc/pd/witc/ao340ap/prodlit/airbo_dis.htm.

Wireless—CNP [online], May 2001 [retrieved May 2, 2001]. Retrieved from the Internet hettp://www.cnpgb.com/microwave-point-to-point.htm.

GigaLink Overview [online], May 2001 [retrieved May 2, 2005]. Retrieved from the Internet http://www.hexi.com/overview.html.

High Speed Wireless LANS [online], May 2001 [retrieved May 2, 2001]. Retrieved from the Internet http://www.halcyon.com/routers/main.htm.

Micropass® 8000 Series [online], May 2001 [retrievede May 2, 2001]. Retrieved from the Internet http://www.racon.com/racon/mp_8000b.html.

Microwave Networks [online], May 2001 [retrieved May 2, 2005]. Retrieved from the Internet http://www.halcyon.com/routers/wireless/interbuilding.htm.

Nortel Networks: Products & Services—Internet Broadband Wireless Access System 3100 [online], May 2001 [retrieved May 2, 2001]. Retrieved from the Internet http://www.nortelnetworks.com/products/01/rts/x30_sdh/index.html.

Proxim—Company Info [online], May 2001 [retrieved May 2, 2001]. Retrieved from the Internet http://www.networkbuyersguide.com/search/29200.htm.

Proxim—Building-to-Building Products [online], May 2001 [retrieved May 2, 2001]. Retrieved from the Internet http://www.proxim.com/products/bldg/bldg.shtml.

Proxim—RL2 Ethernet and Token Ring Access Points Datasheet [online], May 2001 [retrieved May 2, 2001]. Retrieved from the Internet http://www.proxim.com/products/r12/ethtrap.shtml.

Racon—25 years of excellence in security & communications [online], May 2001 [retrieved May 2, 2001]. Retrieved from the Internet http://www.racon.com/.

Racon—Micropass 8100 Series Data Sheet [online], May 2001 [retrieved May 2, 2001]. Retrieved from the Internet http://www.racon.com/racon/mp_8100.html.

Racon's Wireless LAN/MAN Systems [online], May 2001 [retrieved May 2, 2001]. Retrieved from the Internet http://www.racon.com/racon/lan.html.

RadioLAN—Home of the 10 Mbps Wireless LAN [online], May 2001 [retrieved May 2, 2001]. Retrieved from the Internet http://www.radiolan.com.

Solectek Corporation Wireless Bridges and Routers [online], May 2001 [retrieved May 2, 2001]. Retrieved from the Internet http://www.solectek.com/.

The Solutions Group: The Interbuilding Link 4 MBPS [online], May 2001 [retrieved May 2, 2001]. Retrieved from the Internet http://www.halcyon.com/routers/ib14mbps.htm.

The Solutions Group: Wireless Bridge and Microwave Provide LAN-to-LAN Connectivity [online], May 2001 [retrieved May 2, 2001]. Retrieved from the Internet http://www.halcyon.com/routers/ibl10mbp.htm.

The Solutions Group: Alternative Wireless Innovations for Interbuilding Connectivity [online], May 2001 [retrieved May 2, 2001]. Retrieved from the Internet http://www.halcyon.com/routers/500wsl.htm.

The Solutions Group: Wireless Products [online], May 2001 [retrieved May 2, 2001]. Retrieved from the Internet http://www.halcyon.com/routers/prod03.htm.

Camnet Inc.—10 MBPS InterBuilding Link [online], May 2001 [retrieved May 3, 2001]. Retrieved from the Internet http://www.camnetinc.com/text/wprod/mb10.htm.

Windata Wireless Networking [online], May 2001 [retrieved May 3, 2001]. Retrieved from the Internet http://www.swanassoc.com/test/windata.htm.

* cited by examiner

HIGH-SPEED POINT-TO-POINT MODEMLESS MICROWAVE RADIO FREQUENCY LINK USING DIRECT FREQUENCY MODULATION

BACKGROUND OF THE INVENTION

The need to transport high-bandwidth signals from place to place continues to drive growth in the telecommunications industry. As the demand for high-speed access to data networks, including both the Internet and private networks, continues to evolve, network managers face an increasing need to transport data signals over short distances. For example, in corporate campus environments, it is often necessary to implement high-speed network connections between buildings rapidly and inexpensively, without incurring commitments for long-term service contracts with local telephone companies. Other needs occur in residential areas, including apartment buildings, and even private suburban neighborhoods. Each of these settings requires efficient distribution of high-speed data signals to a number of locations.

An emerging class of products provides a broadband wireless access solution via point-to-point communication links over radio carrier frequencies in the microwave radio band. The telecommunications transport signals may be provided on a wire, but increasingly, these are provided on optical fiber media. An optical to electrical conversion stage is thus first required to convert the baseband digital signal. Next, a microwave frequency radio is needed to up-convert the broadband digital signal to a suitable radio carrier frequency. These up-converters are typically implemented using multi-stage heterodyne receivers and transmitters such that the input baseband signal is modulated and then up-converted to the desired radio frequency. For example, in the of an OC-3 rate optical transport signal having a bandwidth of 155 MegaHertz (MHz), the input signal may be up converted to an ultimate microwave carrier of, for example, 23 GHz, through several Intermediate Frequency (IF) stages at lower radio frequencies.

Other implementations may use optical technologies to transport the signal over the air. These technologies use optical emitters and detectors operating in the high infrared range. While this approach avoids conversion of the optical input to an electrical signal, it has certain limitations. First, the light wave carrier has a narrow beamwidth, meaning that the transmitter and receiver must be carefully aligned with one another. Light wave carriers are also more susceptible to changes in physical conditions. These changes may be a result of changes in sunlight and shade exposure, or foreign material causing the lenses to become dirty over time. Other problems may occur due to vibrations from nearby passing automobiles and heating ventilating and cooling equipment. Some members of the public are concerned with possible eye damage from high powered lasers.

SUMMARY OF THE INVENTION

The present invention is a point-to-point microwave radio link that operates in a Frequency Division Duplex (FDD) mode using separate microwave band radio frequency carriers for each direction. The transmitter uses direct digital modulation to convert an input baseband optical rate signal to the desired microwave frequency carrier. The design may be targeted for operation at unallocated frequencies in the millimeter wave spectrum, such from 40–320 GHz.

The direct digital modulation mechanism is implemented using a Continuous Phase-Frequency Shift Keyed (CP-FSK) scheme. The CP-FSK signal is generated at the transmitter by a circuit that uses a stable voltage controlled oscillator operating in the 10–13 GHz band. The VCO is deviated over a narrow frequency range, such as 10–20 MHz. The narrow deviation range need only be a fraction of the ultimately desired deviation range of the microwave carrier, because of the use of a frequency multiplier. In particular, the VCO output is fed to a frequency multiplier that multiplies the modulated microwave signal output to a higher output carrier frequency. A bandpass filter and power amplifier then feed a final stage filter and antenna.

The deviation frequency of the CP-FM modulator is thus chosen to be the reciprocal of the multiplication factor implemented by the frequency multiplier times the desired bit rate. For example, where it is desired to generate an output microwave signal in the 48–52 GHz range for a OC-3 input optical signal, the frequency multiplier may multiply the oscillator output by a factor of four. In this instance the frequency deviation chosen for the direct digital modulator is therefore equal to the input data rate divided by four. In the case of an input OC-3 rate digital data signal, the input data rate is 155.22 Megabits per second (Mbps), meaning that the required VCO deviation is therefore 38.88 MHz. In a case where a frequency multiplication factor of eight is introduced in the output signal processing chain, the VCO deviation may be further reduced accordingly.

The receiver uses a similar but inverse signal chain consisting of a microwave oscillator, frequency multiplier, and bandpass filter. A single down conversion stage is all that is required. By inserting the frequency multiplier between the oscillator and down convertor mixer, the local oscillator remains offset by a wide margin from the input RF carrier frequency. This permits the receiver image reject filters to be implemented more easily.

While the direct digital modulation approach is not necessarily bandwidth-efficient, it provides a low cost alternative to traditional approaches, since the base band modem and multiple RF stages are eliminated. Because there are no heterodyne stages, there also are no images of the modulated baseband signals created on either side of the carrier frequency. Thus, image reject filters are not necessary.

Direct digital modulation also only creates modulation artifacts at high multiples of the VCO center frequency. This allows the output bandpass filters to be implemented using inexpensive waveguide technologies that can easily reject the harmonics of the VCO output, as opposed to more stringent filters that might otherwise be required to reject the harmonics of the baseband signal.

Figure 1:
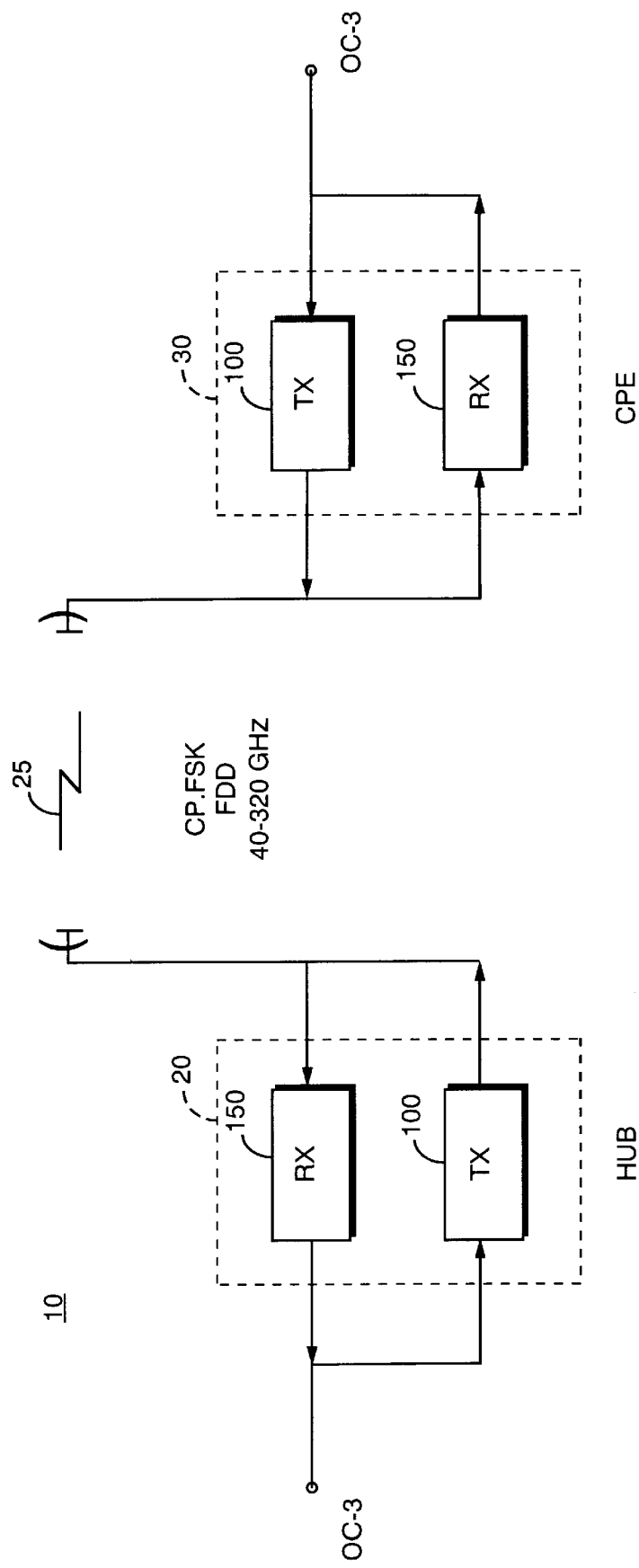
FIG. 1 is a block diagram of a point-to-point, optical to microwave link according to the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a block diagram of a point-to-point wireless communications system that may make use of a direct conversion transmitter and receiver according to the invention. The system 10 includes at least a pair of optical-to-microwave link interfaces 20, 30. A first optical-to-microwave link interface may be located, for example, at a central location such as a Network Access Point (NAP) 20 that provides connections to a data network. In the illustrated example, the network connection is provided from an optical fiber that carriers a transport signal modulated in accordance with the OC-3 standard signaling format. The OC-3 optical signal carries an information signal having a data rate of 155.22 Megabits per second (Mbps). A similar optical-to-microwave converter unit 30 is located at another remote location, such as a Network Termination Point (NTP). The unit 30 also provides connectivity to a similar OC-3 optical transport connection. The units 20, 30 may, for example, be located on the roofs of buildings in a campus environment to which it is desired to provide high-speed network connections between buildings.

In any event, both units 20 and 30 each have a transmitter 100 and receiver 150. The transmitter 100 and receivers 150 operate in a Frequency Division Duplex (FDD) mode, such that transmitter-receiver pairs operate on distinct carrier frequencies. For example, in a downlink direction from unit 20 towards unit 30, the transmitter 100 in unit 20 operates on the same microwave carrier frequency to which the receiver 100 in unit 30 is tuned. Likewise, the receiver 150 in unit 20 is tuned to the microwave carrier which the transmitter 100 in unit 30 operates.

Acceptable operating frequencies for the uplink and downlink may be in an unlicensed microwave band. For example, in the United States, appropriate unlicensed microwave radio bands occur in the various regions of the 40 to 320 GHz band.

It should be understood that the units 20 and 30 may be deployed at any short haul point-to-point locations, such that the specific locations are in effect network peers. It should also be understood that the invention may be used to carry data traffic between different types of locations and different types of network traffic.

Figure 2:
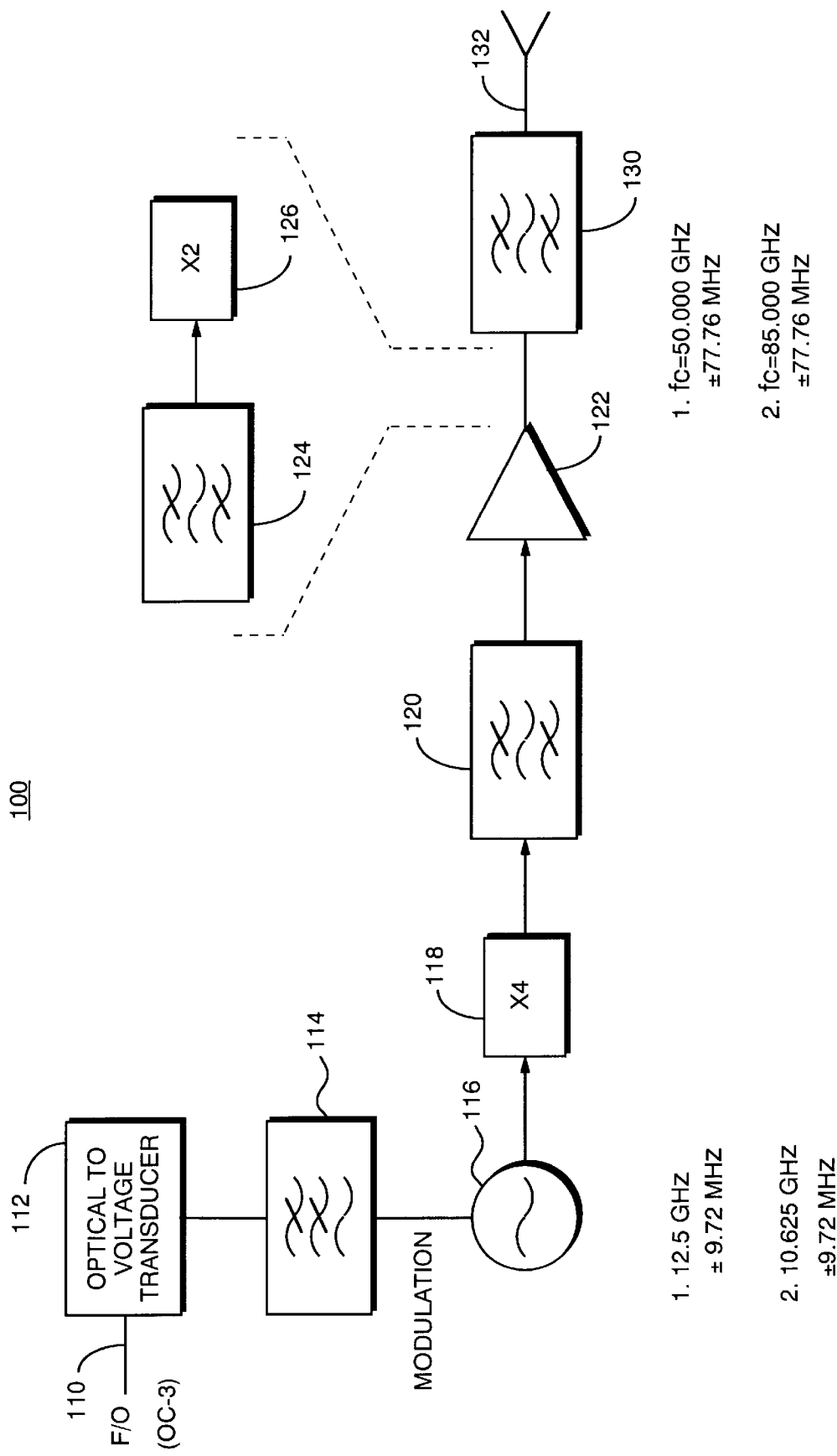
FIG. 2 is a detailed circuit diagram of a Continuous Phase-Frequency Shift Keyed (CP-FSK) transmitter used in the link.

Turning attention now to FIG. 2, an exemplary transmitter 100 will be described in greater detail. The transmitter 100 includes an optical to voltage transducer 112, a baseband filter 114, a direct modulator 116, a multiplier 118, a bandpass filter 120, a buffer amplifier 122, an output waveguide filter 130, and a transmit antenna 132. Optionally, a second-stage bandpass filter 124 and multiplier 126 may be utilized. The illustrated implementation is for a Continuous Phase-Frequency Shift Keyed (CP-FSK) implementation. As will be understood shortly, the signal radiated by the transmitter 100 has a continuous phase and employs frequency modulation in order to communicate information to the receiver 150.

In operation, the input OC-3 formatted optical signal is fed to the optical to voltage transducer 112. The transducer 112 produces at its output a raw transport bitstream. For an input optical signal of the OC-3 format, the transport bitstream is a digital signal at a 155.22 Mbps rate. The raw transport bitstream is then fed to a lowpass filter 114 to remove any artifacts of the optical to voltage conversion process. It should be understood that other digital input signal types may be supported, such as OC-1, OC-12 or other optical range transport signals.

The modulator 116 is preferably a Voltage Controlled Oscillator (VCO) of the Dielectric Resonator Oscillator (DRO) type. The modulator 116 implements continuous phase Frequency Shift Key (FSK) type modulation shifting to, for example, a lower frequency to indicate a zero data bit and to a higher frequency to indicate a one data bit. The oscillator is implemented such that it preserves a continuous phase during the frequency shifts. The continuous phase nature of the oscillator further relaxes the requirements on the following filters 120, 130 and buffer amplifier 122.

After being converted to a voltage from the optical carrier, the input baseband signal is directly fed to the control input of the VCO 116. The VCO 116 provides a sub-deviated microwave carrier at its output, which shifts in frequency according to the logic state of the input signal. In the preferred embodiment, this deviation is set, however, to a relatively narrow range. For example, given an OC-3 input signal and a desired output signal in the range of 48–52 GHz, the deviation may be approximately over a range of only 38 MHz, in a carrier signal in the range of 10–13 GHz.

The sub-deviation amount is determined by the multiplication factor implemented by the following multiplier 118. In the illustrated embodiment, the multiplier 118 implements a times four multiplication of the VCO 116 output. In accordance with well-known communication theory, the spacing between the deviation frequencies in FM signals is dictated by the desired data rate. Thus, the ultimately transmitted signal must have a deviation of the desired 155.22 Mbps rate. However, the oscillators used in the VCO 116 are not particularly narrow band or stable at such high operating ranges in the 40 GHz and above range. Thus, the approach here is to use a more stable VCO 116 source at a lower range, such as in the 10–13 GHz range, and then to rely upon the multiplier 118 to shift the VCO output up to the desired operating band.

The amount of sub-deviation is thus dictated by the specific multiplication factor implemented by the multiplier 118. In the case illustrated, where the desired output deviation is 155.52 MHz, the input deviation implemented by the VCO 116 may be one-fourth of that or approximately 38.88 MHz. The output of the multiplier 118 is thus a frequency-deviated signal carrying the digital information by the microwave frequency carrier in the desired unlicensed band.

In the illustrated embodiment (number 1), this carrier is 50.000 Ghz, meaning that the VCO 116 is centered at 1.25 GHz.

This raw microwave signal is then fed to the first-stage bandpass filter 120 to remove artifacts of the direct modulation process. Unlike heterodyne receivers, no sidebands are created. Artifacts of the direct modulation process occur only at multiples of the 12.5 GHz VCO 116 carrier and not at image frequencies of 155.52 MHz. No RF sidebands are generated. Thus, the first-stage bandpass filter 120 need only remove the 12.5 GHz harmonics on either side of the 50 GHz carrier frequency. It therefore need not be a particularly sharp roll off filter.

A medium range buffer amplifier 122 then receives the filtered signal and forwards it to an output waveguide filter 130.

The waveguide filter 130 farther reduces the harmonics of the 10 GHz oscillator 116. It need not be an image-reject filter. Such image-reject filters, if they were needed, would further increase the cost. Elimination of the heterodyne stages, while not providing as bandwidth efficient an approach, does produce a less expensive radio.

Optionally, a second-stage multiplier 126 and a bandpass filter 124 may be included for operation at higher frequencies, such as in the 81 to 87 GHz band. In example 2, the microwave carrier is 856 GHz, generated from a 10.625 GHz VCO. In this instance, the input deviation may be even smaller, since the multiplication factor is times eight. Thus, the input deviation for the OC-3 signal may be in this instance in the range of only 9.72 MHz. The point is, as before, to make the deviation implemented by the VCO 116 to be the reciprocal of the overall multiplication factor in the RF chain multiplied by the designed data rate. This ensures that after the frequency multiplication stages 118, 126, the carrier bandwidth is consistent with the data rate of the input signal.

Figure 3:
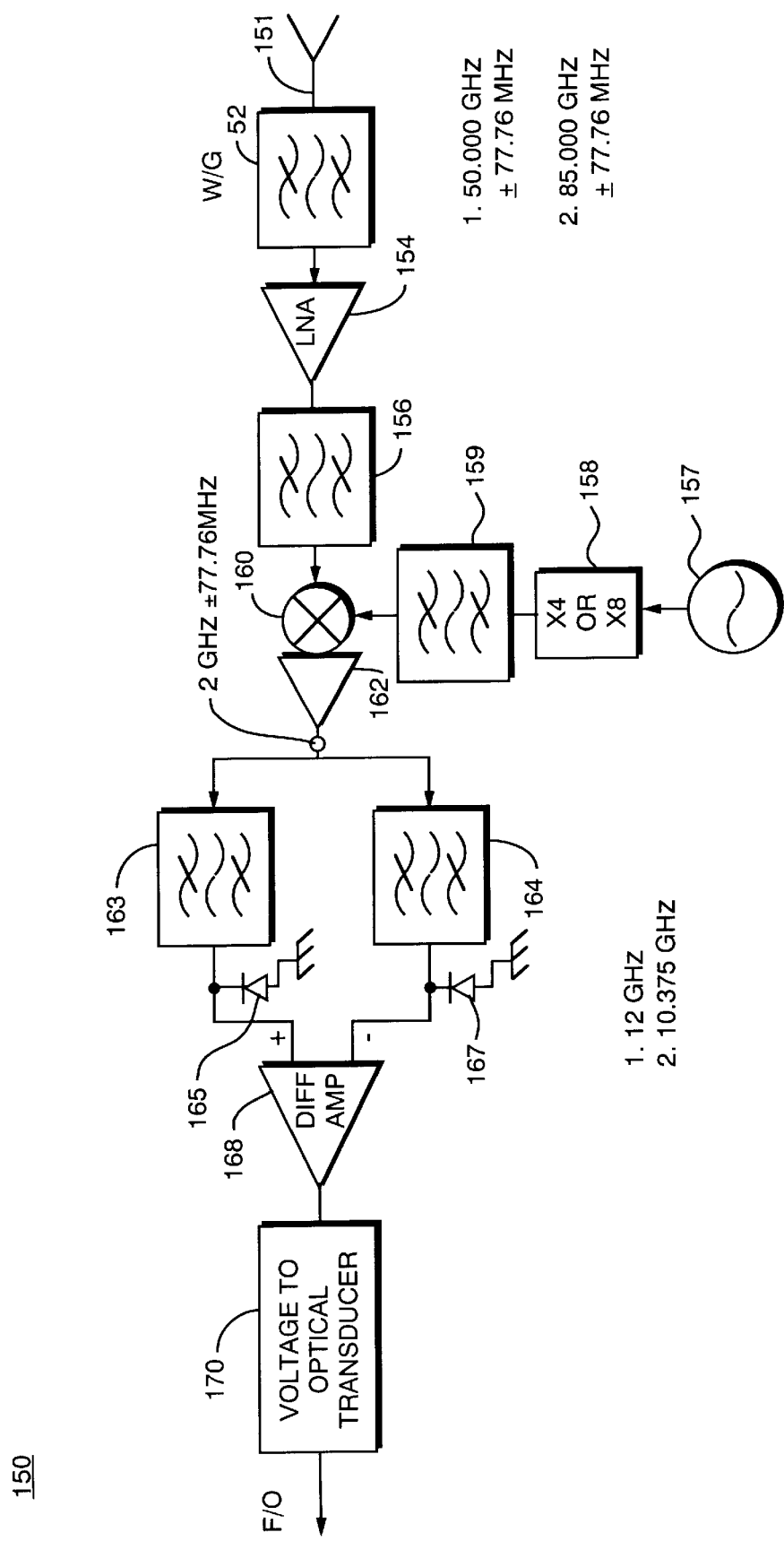
FIG. 3 is a detailed circuit diagram of a CP-FSK receiver.

Turning attention now to FIG. 3, an exemplary receiver 150 will be described in greater detail. This receiver includes a receiving antenna 150, input waveguide filter 152, low-noise amplifier 154, bandpass filter 156, local reference generator 160, mixer 161, buffer amplifier 162, a pair of bandpass filters 163, 164, and associated detectors 165 and 167, a differential amplifier 168 and voltage-to-optical transducer 170.

The input signal provided to the receiving antenna 150 is fed to the waveguide filter 152. This filter, having a center frequency in the 50 or 85 GHz range, as the case may be, filters the desired signal from the surrounding background information.

The low-noise amplifier 154 may be implemented as a Monolithic Microwave Integrated Circuit (MMIC) feeding a planar bandpass filter in the 50 or 85 GHz range. The low noise amplifier typically has a 6–8 decibel (dB) noise figure and provides 10–20 dB of gain. The secondary filter 156 may be implemented as needed prior to the down-converter mixer stage 161.

The local oscillator reference generator 160 consists of a 12.5 GHz or 10.375 GHz oscillator 157, frequency multiplier 158 and bandpass filter 159. The arrangement chain of components is identical to that used in the transmitter, namely the modulator 116, multiplier 118, and bandpass filter 120.

The down-converter 161 uses a single mixer that provides the baseband information to a buffer amplifier 162. Thus, the resulting signal is the basic raw 155.52 MHz information modulated onto the microwave carrier output. For example, a logical bit one may be indicated by a 2.077 GHz frequency, namely 2 GHz plus one-half of 155.52 MHz and the logical one information may be associated with 1.923 GHz. Thus, the pair of bandpass filters 163 and 164 are tuned respectively to receive the frequencies indicating a data bit of zero or data bit of one, respectively.

The detector diodes 165 and 167 provide an output indication when energy is present in the output of the respective bandpass filters 163 or 164. These detected signals are then fed to the differential amplifier 168 to provide a resulting digital signal. This is then fed to the voltage-to-optical transducer 170 to reconstruct the OC-3 format optical transport signal. The center frequencies of the two filters 163 and 164 differ by 155.52 MHz.

Down-conversion directly to the relatively high IF of 2 GHz provides for a simpler discriminator implementation, i.e., the respective bandpass filters may be at a microwave frequency rather than at baseband. This results from the fact that the resulting local oscillator signal fed to the down-convertor mixer 161 is offset from the RF carrier by 2 GHz, and ensures that it is easier to reject images in the bandpass filters 163 and 164.

The invention, therefore, provides for direct modulation of the input bitstream utilizing Continuous Phase Frequency Shift Keyed. No manipulation of the bitstream is required such as in the case of baseband modulation. Furthermore, because of the direct up-conversion to the desired microwave frequency carrier, multiple heterodyne stages are eliminated. Heterodyne stages, while providing for efficient filtering topologies, create interference and spurious noise problems, as well as increased cost in overall implementation.

By modulating the carrier source, such as provided by a voltage-control oscillator at a deviation frequency less than the desired baud rate by a factor of 1/n, with n being the multiplication factor in the up-conversion chain, the overall design is greatly simplified. Standard microwave component building blocks can be used in a highly-producible assembly as a result.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:

a transport to microwave radio frequency adapter that accepts an input telecommunications transport signal on an input port and converts information in such signal to a desired microwave Radio Frequency (RD carrier, the input transport signal carrying information at an input bit rate, wherein the transport to microwave RF adapter further comprises:

a voltage-control oscillator, coupled to receive the input transport signal, the voltage-control oscillator implementing a continuous phase frequency shift keyed deviation such that a first frequency is selected to indicate a first logical value for an input data bit in the transport signal and a second frequency is selected to indicate a second logical value for an input data bit in the transport signal, the deviation between the two frequencies selected to be equal to a predetermined fraction of the input bit rate;

a first frequency multiplier connected to receive the output of the voltage-controlled oscillator and to multiply the output of the voltage controlled oscillator to the desired microwave RF carrier; and a microwave RF to transport adapter, to convert a received microwave RF signal to a transport signal carrying an output telecommunications transport signal, wherein the microwave RF to transport adapter further comprises:

an oscillator, operating at a carrier frequency which is a predetermined fraction of a desired direct down-conversion frequency;

a second frequency multiplier, connected to receive the oscillator output, and to multiply the oscillator output up to the desired direct down-conversion frequency; and a mixer, coupled to the frequency multiplier and the microwave RF signal, to provide a down-converted transport signal; and a pair of bandpass filters, a first bandpass filter tuned to a frequency which is equal to the down-conversion frequency plus one-half a data rate of the down-converted transport signal, and a second bandpass filter tuned to a frequency which is equal to the down-conversion frequency minus one-half the data rate of the down-converted transport signal.

2. An apparatus as in claim 1 wherein the telecommunications transport signal is provided on an optical physical medium.

3. An apparatus as in claim 2 additionally comprising:

an optical-to-voltage transducer connected to receive the telecommunications signal and to provide a baseband electrical signal at an output.

4. An apparatus as in claim 1 wherein the first frequency multiplier implements a multiplication factor which is a reciprocal of the predetermined fraction used as the deviation in the voltage-controlled oscillator.

5. An apparatus as in claim 4 wherein the first frequency multiplier is implemented in a plurality of frequency multiplication stages.

6. An apparatus as in claim 1 wherein the voltage-controlled oscillator and first frequency multiplier perform a direct conversion of the input transport signal to the microwave RF carrier.

7. An apparatus as in claim 6 wherein the direct conversion is performed without using the input transport signal to modulate an intermediate carrier signal.

8. An apparatus as in claim 1 additionally comprising:

a microwave bandpass filter connected to the output of the first frequency multiplier to filter harmonics of the carrier frequency of the voltage-controlled oscillator.

9. An apparatus as in claim 1 additionally comprising:

a pair of detector diodes, each diode connected to a respective one of the bandpass filters, and to each provide a detected signal.

10. An apparatus as in claim 9 additionally comprising;

a differential amplifier, connected to receive the two detected signals, and to provide the output transport signal.

11. An apparatus as in claim 10 additionally comprising:

an electrical-to-optical transducer, coupled to the differential amplifier output, to provide an optical transport signal.

\* \* \* \* \*